J. G. EVENDEN.

Sheet-Metal Cans.

No. 5,599. Reissued Oct. 14, 1873.

Witnesses:
F. Cortez Wilson
John W. Munday

Inventor:
John G. Evenden

AM. PHOTO-LITHOGRAPHIC Co. N.Y. (OSBORNE'S PROCESS.)

UNITED STATES PATENT OFFICE.

JOHN G. EVENDEN, OF CHICAGO, ILLINOIS.

IMPROVEMENT IN SHEET-METAL CANS.

Specification forming part of Letters Patent No. 115,943, dated June 13, 1871; reissue No. 5,599, dated October 14, 1873; application filed August 22, 1873.

DIVISION C.

*To all whom it may concern:*

Be it known that I, JOHN G. EVENDEN, of Chicago, in the county of Cook and State of Illinois, have invented certain new and useful Improvements in Sheet-Metal Cans; and I do hereby declare the following to be a full, clear, and exact description of the same, reference being had to the accompanying drawing forming part of this specification, in which—

Figure 1:
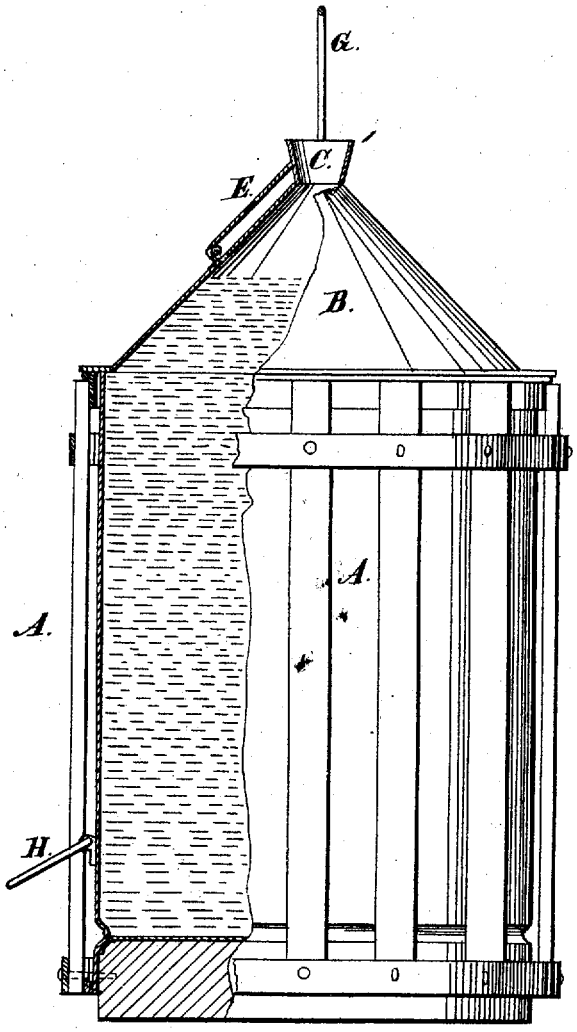
Figure 2:
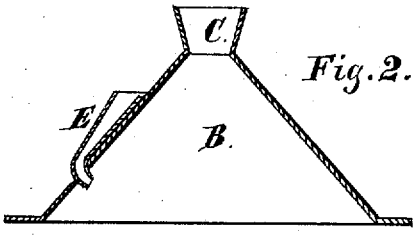

Figure 1 is a side view, a portion of the wall at the top and bottom having been broken away to reveal the construction, and showing the arrangement. Fig. 2 is a section of the top of the can, showing the improved vent.

Similar letters of reference in the drawing indicate corresponding parts.

This invention consists of an improved vent or air-supplying aperture to supply air to the interior of the can to facilitate pouring the contents out through the nozzle; and it also consists in the novel arrangement of said vent upon the breast of the can with relation to the bail and the hand-hold thereof.

In the drawing, A represents the body of the can. B is the pitch top. C is the nozzle. Upon the breast of the can I place a small tube, E, (shown at Fig. 2 of the drawing,) its upper end being open to receive a cork or stopper. The lower end of this tube communicates with the interior of the can, the breast of which is pierced for that purpose. This tube E lies flat against the pitch of the breast, pointing obliquely upward toward the nozzle, and may be soldered along its entire length to the breast. Lying in line with the breast, it is, therefore, entirely out of the way in handling the can, and is not likely to receive injury. The stopper or cork, inserted at the top and lying flat against the breast of the can, is not apt to become broken off or displaced, as is apt to be the case with the ordinary vents, where corks are inserted in such a way as to stand perpendicular to the surface of the can. This security for the stopper of the vent and the vent itself becomes of vast importance where cans are subject to the rough handling incidental to transportation. The vent E is applied to the breast of the can half-way between the lugs to which the bail G is attached, and the hand-hold H is applied to the can, or to its casing if it is an incased can, near the bottom, and in line with the vent, so that, when the can is lifted by the bail and swung up by the other hand applied to the hand-hold to pour out the contents, the vent E is always upon the upper side of the can, and consequently there is no danger, if the vent-stopple should be out, of the contents discharging by way of the vent as well as the nozzle.

This arrangement of vent, bail, and hand-hold affords a great convenience in using the can.

I lay no claim to the form of vent shown at Fig. 1 of the drawings, except as to its arrangement with relation to the bail and hand-hold.

Having thus described my invention, what I claim as new, and desire to secure by Letters Patent, is—

1. The combination, with a pitch-top can, A B, of the tube E, opening at its lower end into the can, and open at its upper end to receive a stopple, said tube lying flat against the surface of the oblique breast, substantially as specified.

2. The arrangement of the vent upon the breast of the can equidistant from the lugs which support the bail, and in line with the hand-hold, substantially in the manner and for the purpose specified.

JOHN G. EVENDEN.

Witnesses:
F. CORTEZ WILSON,
L. L. COBURN.